3,225,112
PROCESS FOR PRODUCING 2,3-DIALKYL-2-ALKENES

William D. Hoffman, Park Forest, and Robert M. Eichhorn, Chicago Heights, Ill., assignors to Sinclair Research, Inc., Wilmington, Del., a corporation of Delaware
No Drawing. Filed June 25, 1962, Ser. No. 205,132
4 Claims. (Cl. 260—677)

This invention relates to the production of high selective yields of 2,3-dialkyl-2-alkenes.

Although 2,3-dialkyl-2-alkenes such as 2,3-dimethyl-2-butene have been widely used as chemical intermediates, for instance as starting materials for the production of the corresponding alcohols and aldehydes, they are also known as valuable raw materials for the production of polymers. Unfortunately use of the olefin on a commercial scale has been relatively limited since a satisfactory method for their production has not been discovered. Methods such as the dehydrogenation of 2,3-dimethylbutene and the dehydration of 3,3-dimethyl-2-butanol, for example, result in low yields of 2,3-dimethly-2-butene. Other methods such as the dehydrohalogenation of 1-chloro-3,3-dimethylbutane as reported by L. Schmerling and U. N. Ipatieff in U.S. Patent No. 2,404,927 have also produced low yields of the desired olefins.

It has now been discovered that high selective yields of 2,3-dialkyl-2-alkenes can be obtained by contacting a corresponding 1-halo-3,3-dialkylalkane with an iron catalyst at a temperature of about 400 to 1000° F., preferably about 600 to 900° F.

The 1-halo-3,3-dialkylalkane feedstock of the present invention may be represented by the structural formula:

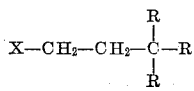

$$X-CH_2-CH_2-\underset{\underset{R}{|}}{\overset{\overset{R}{|}}{C}}-R$$

wherein R is an alphatic monovalent hydrocarbon radical, such as a lower alkyl, including cycloalkyl, for instance of up to 8 carbons, the total carbon atoms in all R's being up to 18, preferably up to 12 and R may be branched or substituted with non-interfering groups; and X is a halogen atom having an atomic number of 17 to 35. Thus, the halogen is substituted on a carbon atom beta to the neo-carbon atom.

The feed materials of the present invention can be obtained by any method known to the art. 1-chloro-3,3-dimethylbutane, for example, can be prepared as described by Louis Schmerling in Journal of the American Chemical Society, 67, 1152–54 (1945). Briefly, the process involves reacting 1 mol of ethylene with t-butyl chloride using a Friedel-Crafts catalyst such as $AlCl_3$, $FeCl_3$, $BiCl_3$ or $ZnCl_2$. The reaction can take place at atmospheric pressure when employing the reactive Friedel-Crafts catalyst such as $AlCl_3$, advantageously at a temperature of about —15° C. Under the conditions listed by Schmerling, i.e. complete conversion, the yield of 1-chloro-3,3-dimethlybutane was reported as 75% theory. The other halides can be made by analogous procedures. Suitable alkayl halide feeds for use in the present invention are, for instance, 1-halo-3,3-dimethylbutane;1-halo-3,3-dimethylpentane; 1-halo-3,3-dimethylhexane; 1-halo-3,3,4-trimethyl pentane, 1-halo-3,3-dimethyl-5,5-dimethylhexane; etc. The alkyl halides can be substituted with non-interfering groups if desired.

The essentially elemental iron catalyst of the present invention can be for instance in the form of iron chips, iron wire, iron shavings, iron tubes or the catalyst may comprise finely divided iron on a non-acidic essentially neutral support such as carbon or silica in order to avoid side reactions. The amount of iron employed is that sufficient to give a catalytic effect. With supported catalysts the amount generally employed is about 1 to 25%, preferably 5 to 15%, by weight of the catalyst. The weight hourly spaced velocity (weight of feed per weight of catalyst per hour) is often about 1 to 25 or more, preferably about 5 to 15. The reaction can be conveniently carried out at atmospheric pressure but reduced or elevated pressures can be employed.

Under the reaction conditions employed there is produced a highly selective mixture of 2,3-dialkyl-1-alkene, 2,3-dialkyl-2-alkene and 3,3-dialkyl-1-alkene, said mixture predominating in the 2,3-dialkyl-2-alkene. Only trace amounts, if any, of other $C_6$ olefins are formed. The desired 2,3-dialkyl-2-alkene is then separated from the reactor effluent as by fractionation and because of the absence of trace amounts of other "contaminating" $C_6$ olefins in the reaction mixture a product of unusually high purity is obtained. As a preferred embodiment, it is possible to recycle to the reactor separated 2,3-dialkyl-1-alkene alone or together with unconverted feed. By recycling the 2,3-dialkyl-1-alkene a steady state can be achieved whereby there would ultimately be no net production of 2,3-dialkyl-1-alkene.

The following examples are included to further illustrated the present invention.

EXAMPLE I 13,500 grams of 3,3-dimethyl-1-chlorobutane were passed through a glass reactor packed with iron wool under the conditions shown in Table I below. The reaction product was fractionated to obtain 2,3-dimethyl-2-butene. The results of the run are shown in Table I.

Table I

Feed: 13,500 grams 1-chloro-3,3-dimethylbutane. B.P. 110° C. to 118° C.
Catalyst: Iron wool
Temperature: 865° F.
WHSV: 8
Conversion: 70.6% (mole percent)
Liquid product recovery: 100% (10,642 g., 62 wt. percent olefin)
Grams gas: 22.6 g.

| Composition of dry gas: | Mole percent |
|---|---|
| Isobutane | 0.1 |
| Isobutene | 2.8 |
| Ethane | 0.1 |
| Eethylene | 71.6 |
| Methane | 5.3 |
| Hydrogen | 17.0 |
| Vinylchloride | 0.3 |

| Composition of liquid product: | Wt. percent |
|---|---|
| Isobutene[1] | 1.5 |
| 3,3-dimethylbutene-1 | 6.0 |
| 2-methylbutane-2[1] | 1.5 |
| 2,3-dimethylbutene-1 | 37.3 |
| 2,3-dimethylbutene-2 | 53.7 |

[1] Since a lower than normal range of cuts for feed was used some t-butylchloride and t-amylchloride was present in the feed. Most of these olefins come from this source.

The data of Table I demonstrate the high selective yields of 2,3-dimethyl-2-butene obtainable by the method of the present invention.

EXAMPLE II

To demonstrate the advantages of employing the catalyst of the present invention a series of runs were conducted wherein 3,3-dimethyl-1-chlorobutane was contacted with various other contact materials under the conditions shown in Table II below. For comparison, runs employing the catalyst of the present invention are included. The various catalysts employed and results are also shown in Table II.

Table II

| Feed | 3,3-dimethyl-1-chlorobutane | | | | | | |
|---|---|---|---|---|---|---|---|
| Catalyst | Glass beads | SiO₂ gel | K on Al₂O₃ | Ba/ Al₂O₃ | Tab Alumina | F-1 Gamma Alumina | Steel Wool |
| Temp. (° F.) | 870 | 870 | 870 | 870 | 870 | 870 | 870 |
| WHSV | *24.8 | 8.67 | 8.67 | 8.67 | 8.67 | 8.67 | 8.67 |
| Conversion Wt. Percent | 4.2 | 94.2 | 95.8 | 98.2 | 8.3 | 94.3 | 55.5 |
| Product Distrib. Wt. Percent: | | | | | | | |
| C₃ | | <0.1 | <0.1 | 0.2 | 0.2 | 0.7 | 0.2 |
| C₃= | | 0.4 | 0.2 | 0.2 | | 0.9 | |
| iC₄ | <0.1 | 0.2 | 0.2 | 14.0 | 2.5 | 8.3 | 0.7 |
| nC₄ | | <0.1 | | 1.9 | | 2.1 | |
| iC₄= & C₄=1 | <0.1 | 1.7 | 0.6 | 7.8 | 2.1 | 5.5 | 0.9 |
| cis C₄=2 | | 0.3 | 0.6 | 1.4 | | 1.0 | |
| trans C₄=2 | | 0.3 | 0.6 | 0.9 | | 0.8 | |
| iC₅ | <0.1 | 0.1 | 1.0 | 1.9 | | 1.3 | |
| 3MeC₄=1 | | 0.1 | | 0.8 | | 1.2 | |
| nC₅ | | 0.1 | 0.8 | | | 0.2 | |
| C₅=1 | | 0.1 | | | | | |
| 2MeC₄=1 & 3, 3DiMeC₄=1 | 18.6 | 3.6 | 2.7 | Trace | 13.1 | 1.0 | 6.6 |
| trans C₅=2 | | 0.2 | 1.0 | 2.3 | | 1.1 | |
| cis C₅=2 | | 0.1 | 0.5 | 1.2 | | 1.0 | |
| 2MeC₄=2 | | 0.8 | 2.9 | 8.5 | | 5.5 | |
| Isoprene | | 0.4 | 1.5 | 7.8 | | 5.5 | |
| 4MeC₅=1 | | 2.5 | 4.9 | 8.9 | | 5.5 | |
| cis 4MeC₅=2 | | | | | | 2.1 | |
| 2,3DiMeC₄=1 | 35.3 | 23.6 | 15.8 | 4.7 | 37.5 | 5.1 | 32.2 |
| trans 4 MeC₅=2 | | 3.9 | 4.5 | 5.4 | | 3.0 | |
| 2MeC₅=1 | | 5.4 | 8.5 | 7.6 | | 6.2 | |
| trans C₆=2 & cis & trans C₆=3 & 2ETC₄=2 | | 4.8 | 7.1 | 6.2 | | 10.1 | |
| 2MeC₅=2 | | 8.5 | 9.8 | 5.2 | | 8.8 | |
| trans 3MeC₅=2 & cis C₆=2 | | 6.2 | 7.0 | 6.4 | | 8.2 | |
| cis 3MeC₅=3 | | 6.3 | 11.6 | 4.3 | | 8.6 | |
| 2,3DiMeC₄=2 | 46.1 | 30.0 | 18.8 | 1.9 | 44.6 | 6.6 | 59.4 |

*LHSV—All heavier chloride-containing material than 2,3-DiMeC₄=2 was stripped off before analysis.

The data of Table II demonstrate the superior results obtained by use of the catalyst of the present invention as compared to other contact materials. Note, for instance, that the alumina catalysts employed were either inactive or gave low yields of 2,3-dimethyl-2-butene. The alkali or alkali earth metal on alumina catalysts used gave inferior yields and in most cases poor selectivity. The silica gel catalyst although producing relatively good yields was found to give considerable quantities of other products including C₆ olefins other than 2,3-dimethyl-2-butene, 2,3-dimethyl-1-butene and 3,3-dimethyl-1-butene.

We claim:
1. A method for the production of 2,3-dialkyl-2-alkenes which comprises contacting with a catalyst consisting essentially of elemental iron at a temperature of about 400 to 1000° F., a halogenated hydrocarbon feed having the structural formula:

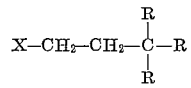

wherein R is a lower alkyl radical, the total carbon atoms being up to 18; and X is a halogen atom having an atomic number of 17 to 35.

2. The method of claim 1 wherein the temperature employed is about 600 to 900° F. and the weight hourly space velocity is about 5 to 15.

3. The method of claim 1 wherein the halogenated hydrocarbon is 1-chloro-3,3-dimethylbutane.

4. A method of producing selective yields of 2,3-dimethyl-2-butene which comprises contacting 1-chloro-3,3-dimethylbutane with a catalyst consisting essentially of elemental iron at a temperature of about 400 to 1000° F., separating from the reaction mixture 2,3-dimethyl-2-butene and 2,3-dimethyl-1-butene and recycling 2,3-dimethyl-1-butene to the reactor.

References Cited by the Examiner

UNITED STATES PATENTS

| 2,065,323 | 12/1936 | Thomas et al. | 260—677 |
| 2,288,580 | 6/1942 | Baehr | 260—677 |
| 2,404,927 | 7/1946 | Schmerling et al. | 260—677 |
| 2,490,973 | 12/1949 | Leonard et al. | 260—677 |
| 2,613,233 | 10/1952 | Blumer | 260—677 |

ALPHONSO D. SULLIVAN, *Primary Examiner.*